United States Patent
Patel et al.

(10) Patent No.: US 8,403,152 B2
(45) Date of Patent: Mar. 26, 2013

(54) FAIL SAFE MECHANISM

(75) Inventors: Hemang Patel, Middletown, CT (US);
Keith Wesner, East Hampton, CT (US);
Thomas J. Hamlin, Vernon, CT (US);
Robert A. Governal, Middletown, CT (US); Guillermo M. Vidal, Cincinnati, OH (US); Dimitris I. Collias, Mason, OH (US); Jeannine R. Bahm, Milford, OH (US)

(73) Assignees: Pur Water Purification Products, Inc., Cincinnati, OH (US); 3M Innovative Properties Company, St. Paul, MN (US)

( * ) Notice: Subject to any disclaimer, the term of this patent is extended or adjusted under 35 U.S.C. 154(b) by 1906 days.

(21) Appl. No.: 11/536,918

(22) Filed: Sep. 29, 2006

(65) Prior Publication Data

US 2007/0075025 A1  Apr. 5, 2007

Related U.S. Application Data

(60) Provisional application No. 60/722,775, filed on Sep. 30, 2005.

(51) Int. Cl.
*B01D 39/00* (2006.01)
*B01D 29/00* (2006.01)

(52) U.S. Cl. ............ 210/501; 210/502.1; 210/653; 210/650; 210/321.6; 210/490; 210/89

(58) Field of Classification Search .......... None
See application file for complete search history.

(56) References Cited

U.S. PATENT DOCUMENTS

| | | | |
|---|---|---|---|
| 5,868,933 A | 2/1999 | Patrick et al. | |
| 6,630,016 B2 | 10/2003 | Koslow | |
| 6,783,713 B2 | 8/2004 | Tremblay et al. | |
| 6,835,311 B2 | 12/2004 | Koslow | |
| 2003/0200868 A1 | 10/2003 | Koslow | |
| 2004/0159596 A1 | 8/2004 | Mitchell et al. | |
| 2004/0164018 A1 | 8/2004 | Mitchell et al. | |
| 2004/0206682 A1* | 10/2004 | Hamlin et al. | 210/321.6 |
| 2005/0263453 A1 | 12/2005 | Collias et al. | |
| 2005/0279696 A1 | 12/2005 | Bahm et al. | |
| 2009/0045106 A1* | 2/2009 | Kuennen et al. | 210/89 |

FOREIGN PATENT DOCUMENTS

| | | |
|---|---|---|
| KR | 10-0278516 | 10/2000 |
| KR | 20-0307789 | 3/2003 |
| KR | 20-0361789 | 9/2004 |

* cited by examiner

*Primary Examiner* — Krishnan S Menon
(74) *Attorney, Agent, or Firm* — Scott A. Baum

(57) ABSTRACT

In one embodiment, the present disclosure provides fail-safe mechanisms for final filters. The fail-safe mechanisms of the present disclosure include a prefilter that is essentially transparent or translucent to TOC contaminants and a microporous filter downstream from the prefilter that filters contaminants by means of size-exclusion, mechanical interception, coagulation, or a combination thereof, the filter being adapted to significantly reduce fluid flow and undergo blockage under a challenge by TOC contaminants. In another embodiment, the present disclosure provides a method of filtration that includes the steps of providing a microporous filter disposed upstream from a final filter, the microporous filter capable of filtering contaminants from a fluid by means of size-exclusion, mechanical interception, coagulation, or a combination thereof, and said filter being adapted to significantly reduce fluid flow and undergo blockage under a challenge by TOC contaminants, and filtering the fluid through the microporous filter

15 Claims, 2 Drawing Sheets

FAIL SAFE MECHANISM

RELATED APPLICATIONS

This application is a continuation-in-part of commonly owned U.S. Provisional Patent Application Ser. No. 60/722,775, filed Sep. 30, 2005, of Hemang Patel et al., entitled "FAIL SAFE MECHANISM," the disclosure of which is herein incorporated by reference to the extent not inconsistent with the present disclosure.

BACKGROUND

The present disclosure is related to fail-safe mechanisms for final filters, and in particular, antimicrobial final filters.

In the United States, public drinking water supplies have an excellent history of providing safe drinking water, especially with regards to microbial contamination. Unfortunately, occasional upsets or malfunctions can take place in the water supplies, treatment systems, and distribution systems that result in pathogenic microbial contamination such as protozoan parasites, bacteria, and viruses.

There is a need, therefore, for supplemental water treatment devices that can eliminate or, at least, reduce such pathogenic microbial contamination to a level where the water is safe for human consumption.

SUMMARY

In one embodiment, the present disclosure provides a multi-stage filtration device comprising A) a fail-safe mechanism comprising a prefilter that is essentially transparent or translucent to TOC contaminants, and a microporous filter downstream from the prefilter that filters contaminants by means of size-exclusion, mechanical interception, coagulation, or a combination thereof, and adapted to significantly reduce fluid flow and undergo blockage under a challenge of TOC contaminants, and B) an antimicrobial filter disposed downstream from the microporous filter.

In another embodiment, the present disclosure provides a fail-safe mechanism for use with final contaminant filter comprising a prefilter that is essentially transparent or translucent to TOC contaminants, and a microporous filter disposed downstream from the prefilter that filters contaminants by means of size-exclusion, mechanical interception, coagulation, or a combination thereof, and adapted to significantly reduce fluid flow and undergo blockage under a challenge of TOC contaminants.

In another embodiment, the present disclosure provides a kit comprising a fail-safe mechanism comprising a prefilter that is essentially transparent or translucent to TOC contaminants, and a microporous filter disposed downstream from the prefilter that filters contaminants by means of size-exclusion, mechanical interception, coagulation, or a combination thereof and adapted to significantly reduce fluid flow and undergo blockage under a challenge of TOC contaminants, and information that will inform the user, by words and/or pictures or diagrams, that the use of the fail-safe mechanism will provide water filtration benefits.

In another embodiment, the present disclosure provides a method of filtration comprising the steps of providing a microporous filter disposed upstream from a final filter, the microporous filter capable of filtering contaminants from a fluid by means of size-exclusion, mechanical interception, coagulation, or a combination thereof, and said filter being adapted to significantly reduce fluid flow and undergo blockage under a challenge by TOC contaminants, and filtering the fluid through the microporous filter.

DETAILED DESCRIPTION

In this application:

"Fail-safe mechanism" means a mechanism that ensures that the final filter maintains its contamination-reduction capability until the end of the design life of the final filter.

"Antimicrobial filter" means a filter that reduces the concentration of microorganisms (including viruses, bacteria, and cyst) in a fluid.

"Adsorption" means the ability of certain solids to preferentially concentrate specific substances from a solution onto its surface, for example, intermolecular forces of attraction between solid and substance adsorbed (Vander Waals attraction).

"Size-exclusion" means the filtration mechanism in which the contaminants of size larger than the pore-size of the filter are removed from the filtration stream simply because they cannot squeeze through the filter-pores.

"Mechanical-interception" means the filtration mechanism in which contaminants flowing in a fluid stream are intercepted by the solid-matrix of a filter and the flow of the contaminants is slowed or stopped, eventually leading to capture of the contaminant even though the size of the contaminant may be smaller than the size of the pores in the filter.

"Significantly reduce fluid flow" means to reduce flow to about 5% of the initial flowrate or the rated flowrate.

"Coagulation" means the process of formation of semi-solid lumps in a liquid. Coagulation generally results in increased viscosity of the liquid.

"Total organic carbon (TOC)" means the amount of carbon covalently bonded in organic molecules. Polyanionic acids like humic and tannic acids are sources of TOC.

The fail-safe mechanisms of the present disclosure provide supplemental water treatment to a final filter element. One of the benefits of the fail-safe mechanisms of the present disclosure is that the fail-safe mechanism provides controlled plugging of the mechanism under worst condition water supply (WCWS) resulting in a shut-off of the fluid flow to the final filter prior to the final filter's loss of required contaminant removal capability. Another benefit of the fail-safe mechanisms of the present disclosure is that such mechanisms provide minimal detrimental impact on flow rate and final filter life under typical water supply (TWS) and microbially contaminated water supply (MCWS) conditions.

Figure 1:
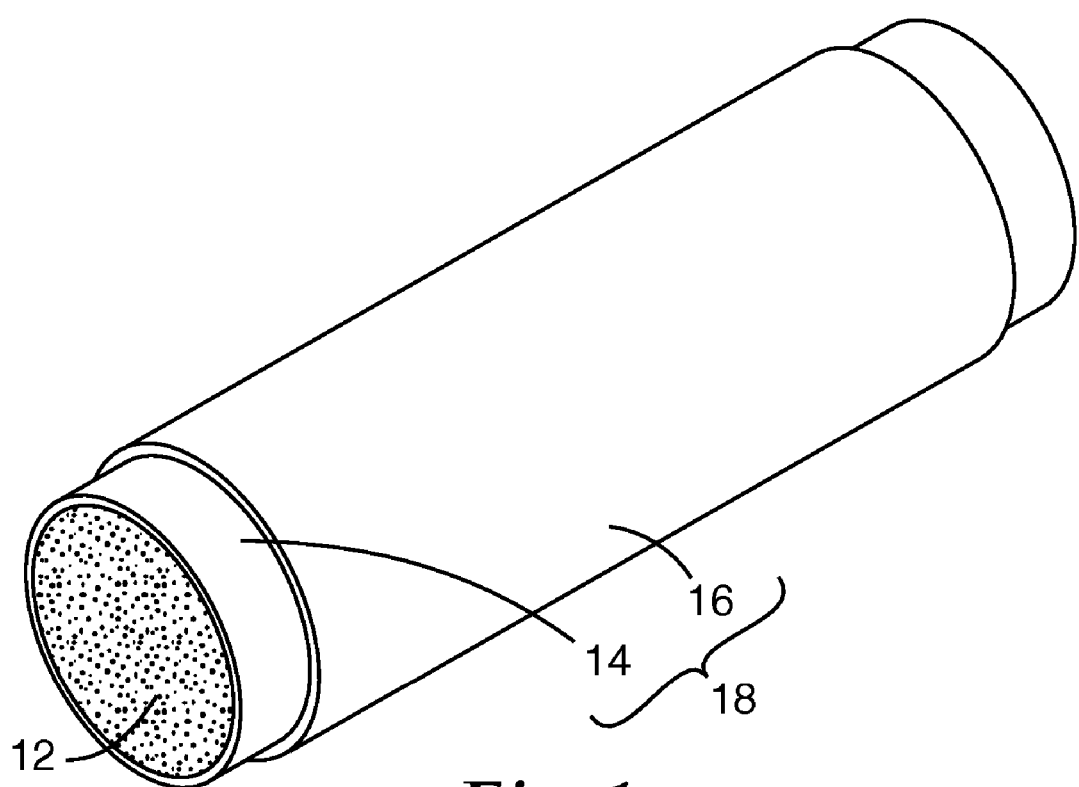
FIG. 1 is a perspective view of an exemplary embodiment of a filtration device having a fail-safe mechanism of the present disclosure.
Figure 2:
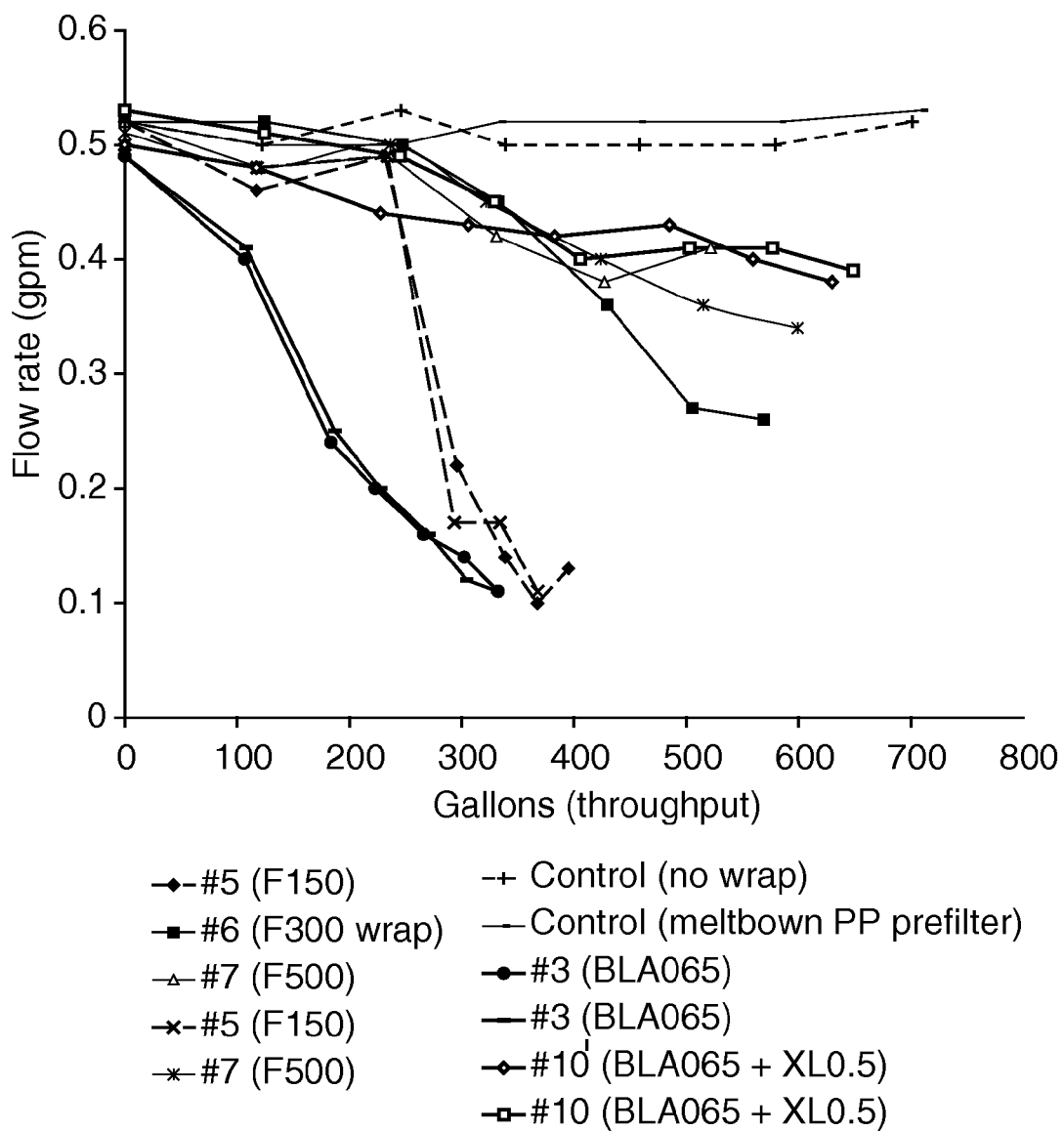
FIG. 2 is a plot of Flow Rate versus Gallons of throughput for Meriden, CT city water through filtration devices of the present disclosure and comparative filtration devices.

FIG. 1 shows an exemplary embodiment of a multi-stage filtration device having a fail-safe mechanism of the present disclosure in combination with a final filter. Multi-stage filtration device 10 incorporates a fail-safe mechanism 18, which in this embodiment comprises a microporous filter 14 and a prefilter 16, wherein the fail-safe mechanism 18 encloses a cylindrical antimicrobial carbon block final filter 12. In this embodiment, the two stage fail-safe mechanism is in direct proximity to the final filter.

In other embodiments, the fail-safe mechanism may be at an upstream position from the final filter and the prefilter may be at an upstream position from the microporous filter. In other embodiments, the filtration device, and each filter stage, can be in the form of a sheet, or spiral wound, or pleated.

In other embodiments, the fail-safe mechanism or the fail-safe mechanism and the final filter is contained within a housing having a fluid inlet and outlet. The housing can be any shape that accommodates the components within. Examples of shapes include cylindrical, oval, rectangular, square, polygonal, and the like.

In operation, the prefilter 16 is adapted to remove particulate contaminants so to protect the microporous filter under TWS and MCWS conditions but is essentially transparent to semi-colloidal total organic carbon (TOC), for example, organic polyanionic acids, under WCWS conditions. The microporous filter 14 is adapted to significantly reduce the fluid flowrate through the microporous filter and undergo rapid and controlled blockage by TOC contaminant under WCWS conditions. The pore-size of the microporous filter is small enough to remove the contaminants by size-exclusion, mechanical-interception, or coagulation, or combinations thereof.

Useful prefilters for use in the fail-safe mechanisms of the present disclosure are those prefilters which are adapted to improve the sediment life of the final filter under TWS, but does not significantly impact the performance of the final filter or the microporous filter. Desirably, the prefilters reduce the sediment-load under TWS by mechanically intercepting and holding the sediment within its depth structure. Typically, the prefilters used in the described present disclosures have a mean flow pore size of about 0.5 to about 50 micrometers (as determined by ASTM F 316) and any size or range of sizes between 0.5 and 50 micrometers. Examples of useful filter media for use in the prefilters include glass fiber media, wet-laid media, felted media, meltblown media, spunbound media, and combinations thereof.

Examples of commercially available prefilter media include glass fiber media sold under the trade designation XL0.5, available from Lydall Inc., Manchester, Conn., and meltblown polypropylene fiber media from Cuno Incorporated, Meriden, Conn.

Useful microporous filters for use in the fail-safe mechanisms of the present disclosure are those which are adapted to stop or shut down the flow through the microporous filter when the water-quality is compromised, for example, the microporous filter shuts down the fluid flow under challenge by a sufficient amount of TOC, for example, polyanionic acids. Desirably, the microporous filter filters contaminants by means of size-exclusion, mechanical interception, or coagulation, or combinations thereof. Typically, the microporous filters used in the described present disclosures have a mean flow pore size of about 0.01 micrometers to about 5 micrometers (as determined by ASTM F 316) and any size or range of sizes between 0.01 and 5 micrometers. Useful filter media for use in the microporous include cast nylon membrane media, glass fiber media, wet-laid media, felted media, meltblown media, spunbound media, and combinations thereof. Examples of commercially available microporous filter media include cast nylon membranes sold under the trade designations LIFEASSURE, having product designations BLA020, BLA045, BLA065, and BLA080, available from Cuno Incorporated; NOVYLON, having product designations F150, F300, and F500, available from Cuno Incorporated; glass fiber media sold under the trade designation XL, having product designations XL0.5, XL9104, and XL1, available from Lydall Incorporated; and meltblown media having the product designations Y8500-050, Y8500-060, Y8500-080, Y8500-040, and Y8500-100, available from Cuno Incorporated, Meriden, Conn.

Useful final filters are those that reduce the contaminants of interest to the customer. Examples of such contaminants include microorganisms including viruses, bacteria, cyst, volatile organic compounds (example chloroform, MTBE, benzene etc), chlorine, chloramines, turbidity, sediment, and asbestos. Examples of useful filter media for such final filters include activated carbon blocks, activated carbon granules or powder, chemically treated or untreated filtration media including media made from organic and/or inorganic fibers, carbon, polymers, ion-exchange resins, ceramics, celluloses, rayon, wool, silk, glass, metal, alumina, silica, zeolites, diatomaceous earth, and combinations thereof.

In another embodiment, the present disclosure provides a method of filtration which comprises the steps of providing a microporous filter disposed upstream from a final filter, the microporous filter capable of filtering contaminants from a fluid by means of size-exclusion, mechanical interception, or coagulation, or combinations thereof, and said filter being adapted to significantly reduce fluid flow and undergo blockage under a challenge by TOC contaminants, and passing or filtering the fluid through the filter. In another embodiment, the above method further includes the step of passing or filtering the fluid through a prefilter that is essentially transparent or translucent to TOC contaminants and is upstream for the microporous filter.

In another embodiment, the present disclosure provides a kit which comprises a multi-stage filtration device of the present disclosure and information that will inform the user, by words and/or pictures or diagrams, that the use of the multi-stage filtration system will provide water filtration benefits which include removal of microorganisms. The information may be included separately or the multi-stage filtration device itself may bear the information.

In another embodiment, the present disclosure provides a kit which comprises a fail-safe mechanism of the present disclosure and information that will inform the user, by words and/or pictures or diagrams, that the use of the fail-safe mechanism will provide water filtration benefits including that the mechanism provides fail-safe protection of the downstream final filter, for example, that the final filter will maintain its contamination-reduction capability until the end of its design life. The information may be included separately or the fail-safe mechanism itself may bear the information. The kits may also include packages or packaging materials for containing, shipping, or selling the fail-safe mechanisms and/or multi-stage filtration devices of the present disclosure. The kit may further include a housing having an inlet and an outlet containing the fail-safe mechanism or the fail-safe mechanism and the final filter.

The fail-safe mechanisms and multi-stage filtration systems of the present disclosure may be used in point of use applications, such as in-line filtration for home or office; personal water filtration; appliances, such as refrigerators, water coolers, and ice-makers; medical applications; electrical applications; and other potable water applications.

For one particular application in the field of antimicrobial drinking water filtration devices, the State of California requires that a water filtration device using electrokinetic and/or an adsorptive mechanism to reduce microorganisms provide a "fail-safe mechanism" ensuring that the antimicrobial filter does not lose its microorganism reduction capability until the end of life of such filter. One way to demonstrate a fail-safe mechanism is to show that the flowrate through the fail-safe mechanism significantly reduces under a challenge of organic polyanionic acids (for example, humic acids). Polyanionic acids compete with microorganisms for adsorptive and/or charged-sites on the antimicrobial filter. If the fail-safe mechanism plugs under the humic acid challenge before the antimicrobial filter loses its capacity for microorganism reduction, then the State of California would consider the filtration device to be "fail-safe".

EXAMPLES

Test Methods
Fail-Safe Mechanism Protocol

Humic and tannic acids are known to detrimentally affect the ability of antimicrobial filters to reduce microorganisms from water particularly at high pH around 9.0. Hence, some regulatory agencies may require that a filter demonstrate 6-log reduction of a bacteria like raoultella terrigena (RT) and 4-log reduction of a phage like MS-2 in presence of humic or tannic acids and at high pH.

The filtration devices tested were challenged with raoultella terrigena and MS-2 in the influent concentrations of $2.18 \times 10^8$ cfu/L and $5.35 \times 10^7$ cfu/L respectively in a challenge solution at a pH of 9 and TOC level of 10 ppm.

Water samples were collected before and after the filtration device at regular intervals and tested for contamination.

A filtration device would be considered as fail-safe if such device demonstrates a greater than 6-log reduction for RT and 4-log reduction for MS-2 until the flow of fluid through the filtration device shuts down.

The log-reduction value (LRV) of the filtration devices were calculated based on the following equation:

99.9999% reduction of RT corresponds to an LRV of 6, which is the required minimum value for RT reduction; and 99.99% reduction of MS-2 corresponds to an LRV of 4, which is the required minimum value for MS-2 reduction.

City Water Challenge Protocol

A single source of city-water (Meriden, Conn.) was connected to a manifold that diverts the water-flow to multiple stations having filtration devices. Flow through each of the filtration devices were measured by using flow-meters and the total gallons processed by each filtration device was measured by using flow-totalizers plumbed to the filtration devices. The filtration devices were tested simultaneously on these multiple-stations and, at regular intervals, measurements of gallons processed and flowrate were taken. This procedure is a comparative test method as opposed to an absolute method. The filtration device whose flowrate drops rapidly compared to other filters that were tested simultaneously was deemed a filter with low sediment-life.

Filtration Device Assembly

A sheet (8"×6") (20.3×15.2 cm) of microporous filter media was manually wrapped around the outside of a cylindrical carbon block (8"(20.3 cm) length×1.550Δ(3.9 cm) OD"7/16"(1.1 cm) ID). The antimicrobial carbon blocks were made as described in U.S. Application Ser. No. 11/101,130, filed on filed Apr. 7, 2005, and titled Water Filter Materials and Water Filters Containing a Mixture of Microporous and Mesoporous Carbon Particles, incorporated by reference in this application for the description of the antimicrobial carbon blocks. Hot melt adhesive (3M JETMELT brand) was applied uniformly on one edge of the wrapped filter media sheet along the length of the carbon block and the second edge was made to overlap and stick on the adhesive. After allowing the adhesive to cool off, the filter media was sealed integrally along the length of the block.

If used, a prefilter was wrapped manually around the assembly of the carbon block and microporous filter media. The prefilter was held in place by either holding it in place using an elastic cylindrical net or by gluing or heat-staking the prefilter in a few spots where the two edges of the wrapped prefilter overlap.

This carbon block+filter media+prefilter assembly was then potted into endcaps using a hot-melt adhesive.

| Glossary | | |
|---|---|---|
| Term | Description | Source |
| MB080 | Meltblown polypropylene filter media having a mean flow pore size of about 10.5 µm. | Cuno Incorporated |
| BLA065 | Cast multizone nylon membrane media having a mean flow pore size of upstream: 1.2 µm; downstream: 0.65 µm | Cuno Incorporated |
| BLA020 | Cast multizone nylon membrane media having a mean flow pore size of upstream: 0.65 µm; downstream: 0.2 µm. | Cuno Incorporated |
| BLA045 | Cast multizone nylon membrane media having a mean flow pore size of upstream: 0.8 µm; downstream: 0.45 µm. | Cuno Incorporated |
| BLA080 | Cast multizone nylon membrane media having a mean flow pore size of upstream: 2.5 µm; downstream: 0.8 µm. | Cuno Incorporated |
| F150 | Nylon membrane having a mean flow pore size of 1.3 µm. | Cuno Incorporated |
| F300 | Nylon membrane having a mean flow pore size of 1.8 µm. | Cuno Incorporated |
| F500 | Nylon membrane having a mean flow pore size of 2.8 µm. | Cuno Incorporated |
| XL 0.5 | Binderless glass-fiber media having a mean flow pore size of 1 µm. | Lydall Incorporated |
| XL9104 | Binderless glass-fiber media having a mean flow pore size of 5 µm. | Lydall Incorporated |
| XL1 | Binderless glass-fiber media having a mean flow pore size of 2 µm. | Lydall Incorporated |

Examples 1-8

Eight filtration devices were tested according to the Fail-Safe Mechanism Protocol described above. The filtration devices were made generally by the method described above. The resulting data are shown below in Table 1.

TABLE 1

| Raoultella terrigena | R.t. (CFU/L) | | | |
|---|---|---|---|---|
| CONT.1 | 2.72E+08 | | | |
| CONT.2 | 1.75E+08 | | | |
| Geo. Mean | 2.18E+08 | | | |

| Raoultella terrigena | LRV 25% reduction in flow | LRV 50% reduction in flow | LRV 75% reduction in flow | LRV 95% reduction in flow |
|---|---|---|---|---|
| Example 1 (BLA065 + XL1) | 7.34 | | | 7.34 |
| Example 2 (BLA065 + XL1) | 7.34 | | 7.34 | 7.34 |
| Example 3 (BLA065 + XL1) | 7.34 | | | 7.34 |
| Example 4 (BLA065 + XL1) | 7.34 | | | 5.82 |
| Example 5 (BLA065 + MB080) | 6.02 | | | 6.98 |
| Example 6 (BLA065 + MB080) | 7.34 | | 7.34 | 7.34 |
| Example 7 (BLA065 + MB080) | 7.34 | | | 7.34 |
| Example 8 (BLA065 + MB080) | 7.34 | | | 7.34 |

TABLE 1-continued

| MS2 | MS2 (CFU/L) | | | |
|---|---|---|---|---|
| CONT.1 | 4.70E+07 | | | |
| CONT.2 | 6.10E+07 | | | |
| Geo. Mean | 5.35E+07 | | | |

| MS2 | LRV 25% reduction in flow | LRV 50% reduction in flow | LRV 75% reduction in flow | LRV 95% reduction in flow |
|---|---|---|---|---|
| Example 1 (BLA065 + XL1) | 4.73 | | | 4.73 |
| Example 2 (BLA065 + XL1) | 4.73 | | 4.73 | 4.73 |
| Example 3 (BLA065 + XL1) | 4.73 | | | 4.73 |
| Example 4 (BLA065 + XL1) | 4.73 | | | 4.73 |
| Example 5 (BLA065 + MB080) | 4.73 | | | 4.73 |
| Example 6 (BLA065 + MB080) | 4.73 | | 4.73 | 4.73 |
| Example 7 (BLA065 + MB080) | 4.73 | | | 4.73 |
| Example 8 (BLA065 + MB080) | 4.73 | | | 4.73 |

Table 1 above shows that the geometric mean of the inlet challenge of R.t. (Raoultella terrigena) from two containers was about $2.18 \times 10^8$ cfu/ml and that of MS2 was about $5.35 \times 10^7$ pfu/ml. Table 1 also describes the log reduction value (LRV) of raoultella terrigena in the effluent water sample at different sampling points—25%, 50%, 75% and 95% reduction in flowrate through the filter. The reduction in flowrate occurs as the device clogs under the TOC load. The first filtration device is denoted as "Example 1 (BLA065+XL1)" comprised prefilter XL1, microporous media BLA065 and an antimicrobial filter element. Similarly, the fifth filtration device comprised prefilter MB080, microporous media BLA065 and an antimicrobial filter element.

Examples 9-17 and Comparative Examples 1 and 2

Filtration devices were constructed as described above. Certain of these filtration devices were tested according to the Fail-Safe Mechanism Protocol and City Water Challenge described above. The results are shown below in Table 2 and in FIG. 2.

TABLE 2

| Examples | Description | Average gallons processed to reduce the flowrate of the filter to 5% of the initial flowrate under Fail-Safe Mechanism Protocol (WCWS) | Fail-Safe Mechanism Protocol (WCWS) | City Water Challenge Protocol (TWS) (plugs) |
|---|---|---|---|---|
| CE 1 | Carbon block | 30.9 | Fail | No |
| Example 9 | Carbon block + BLA020 | 2.9 | Pass | |
| Example 10 | Carbon block + BLA045 | 5.7 | Pass | |
| Example 11 | Carbon block + BLA065 | 7.0 | Pass | Yes |
| Example 12 | Carbon block + BLA080 | 11.4 | Borderline Pass | |
| Example 13 | Carbon block + F150 | 13.8 | Borderline Pass | |
| Example 14 | Carbon block + F300 | 13.7 | Fail | |
| Example 15 | Carbon block + F500 | 15.6 | Fail | |
| Example 16 | Carbon block + BLA065 + MB080 prefilter | 11.0 | Pass | Yes |
| Example 17 | Carbon block + BLA065 + XL0.5 prefilter | 13.9 | Pass | No |
| CE 2 | Carbon block + MB080 prefilter | 67.7 | Fail | No |

Table 2 summarizes how different filtration devices perform both in terms of fail-safe mechanism protocol (WCWS) and plugging under city water challenge (TWS). The Example "CE 1" comprised an antimicrobial carbon block that flows 30.9 gallons of WCWS water before the flowrate through the filter drops to 5% of the initial flow. Under this case, the filter does not reduce RT by greater than about 6 LRV and MS2 by greater than about 4 LRV. The carbon block filtration device also does not plug easily under TWS. Relatively, the filtration device in example 11 plugs easily under TWS flows about 7 gallons of WCWS water before the flowrate through the device drops below about 5% of initial flow and the filter meets the requirements of the fail-safe mechanism protocol.

Foreseeable modifications and alterations of the present disclosure will be apparent to those skilled in the art without departing from the scope and spirit of the present disclosure. The present disclosure should not be restricted to the embodiments that are set forth in this application, as all such embodiments are representative and for illustrative purposes only.

What is claimed is:

1. A multi-stage filtration device comprising:
   A) a fail-safe mechanism comprising:
      a prefilter that is essentially transparent or translucent to TOC contaminants, and
      a microporous filter downstream from the prefilter that filters contaminants by means of size-exclusion, mechanical interception, coagulation, or a combination thereof, and adapted to significantly reduce fluid flow and undergo blockage under a challenge of TOC contaminants; and
   B) an antimicrobial filter disposed downstream from the microporous filter.

2. The multi-stage filtration device of claim 1 wherein the prefilter has a mean flow pore size of from about 0.5 to about 50 micrometers.

3. The multi-stage filtration device of claim 1 wherein the microporous filter has a mean flow pore size of from about 0.01 micrometers to about 5 micrometers.

4. The multi-stage filtration device of claim 1 wherein the prefilter comprises filtration media selected from the group consisting of glass fiber media, wet-laid media, felted media, meltblown media, spunbound media, and combinations thereof.

5. The multi-stage filtration device of claim 1 wherein the microporous filter comprises filtration media selected from the group consisting of cast nylon membrane media, glass fiber media, wet-laid media, felted media, meltblown media, spunbound media, and combinations thereof.

6. The multi-stage filtration device of claim 1 wherein the antimicrobial filter comprises filtration media selected from the group consisting of organic and/or inorganic fibers, carbon, activated carbon, polymers, ion-exchange resins, ceramics, celluloses, rayon, wool, silk, glass, metal, alumina, silica, zeolites, diatomaceous earth, and combinations thereof.

7. The multi-stage filtration device of claim 1 wherein the antimicrobial filter comprises filtration media selected from the group consisting of activated carbon blocks, activated carbon granules, activated carbon powder, and combinations thereof.

8. A fail-safe mechanism for use with final contaminant filter comprising:
   a prefilter that is essentially transparent or translucent to TOC contaminants; and
   a microporous filter disposed downstream from the prefilter that filters contaminants by means of size-exclusion, mechanical interception, coagulation, or a combination thereof, and adapted to significantly reduce fluid flow and undergo blockage under a challenge of TOC contaminants.

9. The fail-safe mechanism of claim 8 wherein the prefilter has a mean flow pore size of from about 0.5 to about 50 micrometers.

10. The fail-safe mechanism of claim 8 wherein the microporous filter has a mean flow pore size of from about 0.01 micrometers to about 5 micrometers.

11. The fail-safe mechanism of claim 8 wherein the microporous filter comprises filtration media selected from the group consisting of cast nylon membrane media, glass fiber media, wet-laid media, felted media, meltblown media, spunbound media, and combinations thereof.

12. The fail-safe mechanism of claim 8 wherein the prefilter comprises filtration media selected from the group consisting of glass fiber media, wet-laid media, felted media, meltblown media, spunbound media, and combinations thereof.

13. A kit comprising:
   a fail-safe mechanism comprising a prefilter that is essentially transparent or translucent to TOC contaminants, and
   a microporous filter disposed downstream from the prefilter that filters contaminants by means of size-exclusion, mechanical interception, coagulation, or a combination thereof and adapted to significantly reduce fluid flow and undergo blockage under a challenge of TOC contaminants; and
   information that will inform the user, by words and/or pictures or diagrams, that the use of the fail-safe mechanism will provide water filtration benefits.

14. The kit of claim 13 further comprising an antimicrobial final filter.

15. The kit of claim 13 further comprising a final filter for filtering contaminants selected from the group consisting of volatile organic compounds, chlorine, chloramines, turbidity, sediment, asbestos, and combinations thereof.

* * * * *

UNITED STATES PATENT AND TRADEMARK OFFICE
CERTIFICATE OF CORRECTION

Page 1 of 1

PATENT NO. : 8,403,152 B2
APPLICATION NO. : 11/536918
DATED : March 26, 2013
INVENTOR(S) : Hemang R Patel It is certified that error appears in the above-identified patent and that said Letters Patent is hereby corrected as shown below:

On Title Page, in Column 2, under (Abstract)
Line 18, delete "filter" and insert -- filter. --, therefor.

In the Specification

Column 1
Lines 5-6, delete "is a continuation-in-part of commonly owned" and insert
-- which claims priority to --, therefor.

Column 3
Line 33, delete "spunbound" and insert -- spunbond --, therefor.
Line 60, delete "spunbound" and insert -- spunbond --, therefor.

Column 5
Line 62, delete "length×1.550Δ" and insert -- length×1.550" --, therefor.

Column 5
Line 63, delete "OD"7/16"" and insert -- OD 7/16" --, therefor.

In the Claims

Column 9
Line 23, delete "spunbound" and insert -- spunbond --, therefor.
Line 29, delete "spunbound" and insert -- spunbond --, therefor.

Column 10
Line 17, delete "spunbound" and insert -- spunbond --, therefor.
Line 21, delete "spunbound" and insert -- spunbond --, therefor.

Signed and Sealed this
Second Day of July, 2013

Teresa Stanek Rea
*Acting Director of the United States Patent and Trademark Office*